Sept. 27, 1966   H. LEITER   3,275,826
SIGNAL PROCESSING MEANS FOR DETECTED PULSE SIGNALS
Filed Aug. 23, 1963
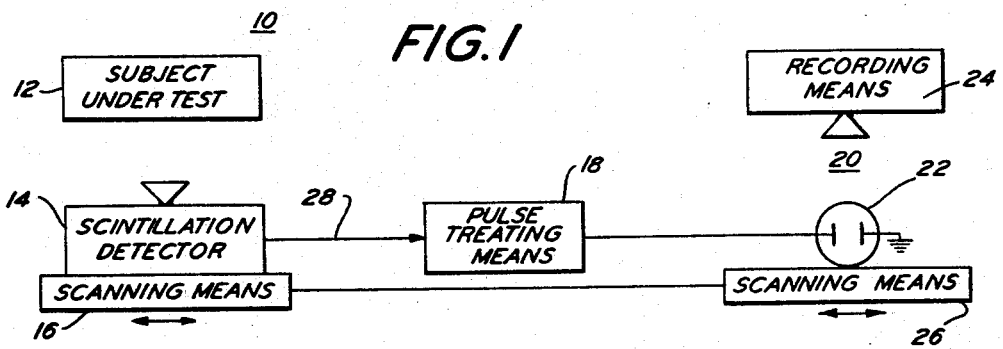
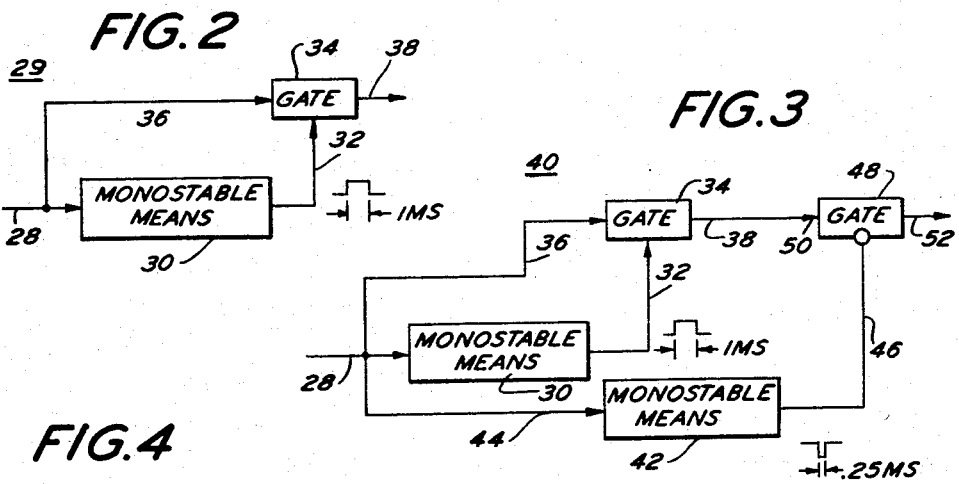
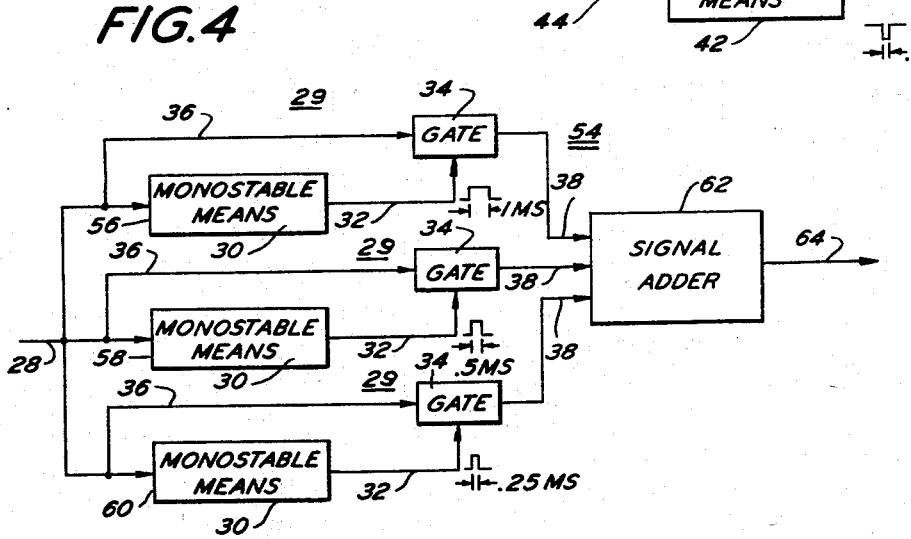
INVENTOR.
HARRY LEITER
BY
Jacob Trachtman
ATTORNEY

United States Patent Office 3,275,826
Patented Sept. 27, 1966

3,275,826
SIGNAL PROCESSING MEANS FOR DETECTED PULSE SIGNALS
Harry Leiter, 107 Henley Road, Lower Merion Township, Montgomery County, Pa.
Filed Aug. 23, 1963, Ser. No. 304,050
19 Claims. (Cl. 250—71.5)

The invention relates to signal processing means and particularly to means for making a record of the distribution and concentration of radioactive sources detected over a scanned region.

Heretofore, pulse information gathered from the detection of radioactive sources has been processed, prior to recording, for the purpose of enhancing areas of high activity. This enhancement has been carried out by circuitry measuring the rate of recurrence of such pulses and using resistor capacitor elements with a time constant to store sequential charges produced by such pulse trains. The use of such enhancement circuitry, however, produces a lag in determining the rate of recurrence of signals which results in time distortion affecting the control of the signal enhancement.

It is, therefore, a principal object of the invention to provide a new and improved signal processing means which eliminates time lag in detecting the pulse recurrence rate of randomly occurring signals.

Another object of the invention is to provide a new and improved signal processing means which eliminates time lag in rate detection and signal enhancement.

Another object of the invention is to provide a new and improved signal processing means for providing signal enhancement weighted to correspond with predetermined pulse recurrence rates.

Another object of the invention is to provide a new and improved signal processing means which will deliver output pulses received at its input having a recurrence rate greater than the predetermined minimum value.

Another object of the invention is to provide a new and improved signal processing means which will deliver output signals received at its input provided the recurrence rate of the input signals are within upper and lower predetermined values.

Another object of the invention is to provide a new and improved signal processing means of simplified form and of high efficiency for recording the distribution and concentration of radioactive sources detected over a scanned region.

Another object of the invention is to provide a new and improved signal processing means having high utility and adaptability to various design requirements.

The above objects of the invention are achieved by providing a signal processing means comprising input means for receiving randomly recurring pulse signals, a signal output line, a signal gating means for conditionally transmitting signals from said input means to said output line, and a signal generating means having an input lead receiving signals from said input means and being responsive to said signals by delivering output signals of predetermined duration for conditioning said gating means to transmit signals to said output line.

A scintillation detector means is provided for scanning a predetermined region and delivering pulse signals to the input means. A recording means receives the output signals of said output line and records same to correspond with the scanning of said region by said detector.

In operation, randomly recurring pulse signals which are detected by the scintillation detector means are delivered to the input means and to the signal generating means. The signal generating means, upon receiving such a pulse, delivers an output signal to the signal gating means, allowing the next occurring pulses to pass through the gating means to the output line, but only during the time of delivery of the output signal from the generating means to the signal gating means. Thus, signals which recur at a repetition rate greater than the rate determined by the duration of the output signal from the signal generating means are delivered to the output line, while signals having a recurrence rate lower than said predetermined value are not delivered to the output line.

The above signal processing means, thus, operates to place a lower limit upon the signal recurrence rate for passage through the signal gating means to the output line.

The signal processing means may also be provided with a second signal gating means positioned between the first signal gating means and the output line for conditionally transmitting signals received from the first gating means to the signal output line. A second signal generating means is also provided having an input lead receiving signals from the input means and being responsive to said signals by delivering a signal of predetermined duration for conditioning the second gating means to inhibit transmission of signals to said output line.

In the operation of this arrangement, the occurrence of a pulse at the input line is delivered to both the first and second signal generating means which generate signals which are respectively delivered to the first and second gating means. The output signal from the first generating means conditions the first gate for the passage of signals therethrough, while the output signal from the second signal generating means inhibits the second gate for the delivery of signals during the duration of its output signal. The output signal from the second generating means has a shorter duration than that of the output signal from the first signal generating means and acts to set an upper limit to the recurrence rate for signals which will be delivered to the output line. Thus, if signals occur at a repetition rate greater than the predetermined value, these signals, although they may pass through the first gate, will be inhibited from passing through the second gate. By this means, signals having a recurrence rate within predetermined upper and lower levels only will be delivered from the input means to the output line.

The signal processing means may be provided with means for delivering output signals in accordance with a predetermined weighted relationship which is a function of the recurrence rate of the input signals. In this form, the signal processing means has a plurality of signal gating means and a plurality of respective signal generating means which are all connected to the input means which receives the randomly recurring pulse signals. Each of the signal generating means provides an output gating signal having a predetermined selected duration to its respective signal gating means. The respective pairs of signal generating means and gating means each provide for the delivery of output signals having respective recurrence rates which are equal to or greater than the respective limit determined by the duration of the output signal from the signal generating means. The output lines from the respective gating means deliver their signals to a signal adding means which provides an output signal having an amplitude determined in accordance with a predetermined function related to the recurrence rate of the signal pulses received by the input means.

The foregoing and other objects of the invention will become more apparent as the following detailed description of the invention is read in conjunction with the drawings, in which:

FIGURE 1 is a diagrammatic illustration in block form of a signal processing means embodying the invention, FIGURE 2 diagrammatically illustrates in block form a pulse treating means of FIGURE 1, FIGURE 3 is a modified form of the block diagram shown in FIGURE 2, and FIGURE 4 diagrammatically illustrates in block form another form of the pulse treating means of FIGURE 1.

Like reference numerals designate like parts throughout the several views.

Refer to FIGURE 1 which diagrammatically illustrates in block form a signal processing means 10 embodying the invention.

The signal processing means 10 is illustrated in connection with the enhancement and recording of pulse signals detected by scanning a region 12 providing radiation sources which may be distributed over the region with various concentrations. For example, this may be a situation where a patient is given a radioactive substance, such as radioactive iodine, for determining malignancy in the thyroid gland, liver, spleen, or other such regions of the body. The malignancy is determined by the concentration of radioactive material within the malignant region. The region of malignancy may thus be recorded by detecting the locations of high radioactivity produced by the concentration of a radioactive substance administered to the patient under test. The degree of concentration of radioactive substances is determined by the recurrence rate of signals detected in the region. In detecting the rate of occurrence of signals for recording the location of such malignancies, it is desirable to eliminate background radiation sources which occur at a low repetition rate and record only the signals occurring within the desired range of recurrence.

To achieve this purpose, a detector, such as a scintillation detector 14, is activated by a scanning means 16 so that the detector 14 senses radiation from a small region of the subject 12 under test and the detector 14 is moved by the scanning means 16 to sequentially cover the entire region being tested.

Upon detecting the radioactive substances, the scintillation detector 14 delivers output pulses to a pulse treating means 18. The pulses occur randomly and the rate of recurrence of such pulses will depend upon the concentration of radioactive sources at the location being scanned by the scintillation detector 14. The pulse treating means 18, after treating the signals received, delivers output signals to a recording means 20 which may comprise a light generating means 22 which is energized by the pulse signals from the treating means 18 and a photographic recording means 24 receiving light from the means 22. The light generating means 22 may be a cold cathode tube, such as the hollow crater type glow modulator tube, commercially known as Sylvania R1131C providing a linear relationship between generated light intensity and signal current. A scanning means 26 moves the light means 22 with respect to the recording means 24 in coordination with the relative position of the scintillation detector 14 with the subject under test 12. By this means, the photographic record records the intensity of radiation detected by the scintillation detector 14 at respective locations of the region scanned of the subject under test 12.

Refer now to FIGURE 2 in which the means 18 is illustrated in greater detail by the pulse treating means 29.

The input signals received from the scintillation detector 14 over line 28 are delivered to a monostable means 30 of the pulse treating means 29 which may be a monostable flip-flop, monostable multivibrator, or pulse generating blocking oscillator. The monostable means 30 has a first stable state and a second unstable state. When in its first state, the monostable means 30, upon receiving an input pulse on the line 28, assumes its second state for a predetermined interval of time. While in its second state, the monostable means 30 delivers an output signal over its line 32 to a signal gating means 34 which has an input line 36 also connected to the line 28. A signal delivered over line 32 to the gate 34 by the monostable means 30 when in its second state, conditions the gate 34 for passage of signals on line 28 to its output line 38. When the monostable means 30, after a predetermined time, returns to its first state, the output signal on line 32 is removed and the gate 34 is prevented from transmitting signals from the line 28 to the output line 38.

Thus, in operation, when the monostable means 30 is in its first state and a train of pulses occurs on the input line 28, the first pulse is delivered to the signal gating means 34 which is inhibited from passage of the signal to the output line 38. The first pulse is also delivered to the monostable means 30, resulting in placing the means 30 in its second unstable state for a predetermined length of time. The monostable means 30 of the pulse treating means 18 is illustrated as having an output signal with a duration of one millisecond. If the next occurring pulse in the train of pulses on line 28 occurs during the time duration of the output signal from the monostable means 30, the signal will be delivered through the gate 34 which now is enabled for the transfer of signals therethrough to the output line 38. However, if the next pulse occurs at a time after the predetermined interval during which the monostable means 30 remains in its unstable state, the monostable means 30 will then return to its first stable state and the gate 34 will be inhibited, preventing the delivery of this pulse to the output line 38.

Thus, in operation, the pulse treating means 29 illustrated in FIGURE 2 acts to prevent the passage of signals which recur at a repetition rate less than a predetermined value. This allows the pulse treating means 29 to eliminate pulses derived from background radiation of a low level which it does not desire to record.

FIGURE 3 discloses in block form a pulse treating means 40 which is a modified form of the pulse treating means 29 of FIGURE 2.

The pulse treating means 40 is identical to the means 29, except that it is provided, in addition, with a monostable means 42 having an input line 44 connected with the line 28 and an output line 46 delivering a gating signal to a second signal gating means 48 which has its input 50 connected to the output line 38 of the gate 34.

In operation, a pulse received by the input line 28 is delivered by line 44 to the input of the monostable means 42 which may be a device similar to the monostable means 30. The monostable means 42 has a first stable state and a second unstable state. With the monostable means 42 in its stable state, the delivery of an input signal over line 44 results in the monostable means 42 assuming its unstable state for a predetermined interval of time. During the interval of time that the means 42 is in its second unstable state, an output signal is delivered over the line 46 to the gate 48, inhibiting the gate 48 and preventing it from transmitting signals received from the output line 38 of gate 34 to the output line 52 of gate 48. The interval of time during which the monostable means 42 remains in its unstable state after being triggered from its stable state is less than an interval of time during which the monostable means 30 remains in its unstable state after being triggered by receiving an input signal. Thus, the output signal from the monostable means 30, which conditions the gate 34 to pass signals therethrough, has a duration which is greater than the duration of the signal delivered by the means 42 to the gate 48 inhibiting it from passing signals to its output line 52. For illustration, the output signal from means 30 may have a duration of 1 millisecond, while the signal from means 42 may have a duration of .25 millisecond.

By this arrangement, the monostable means 30, in combination with the gate 34, sets a lower limit for the recurrence rate of the input signals on line 28 transmitted to line 38, while the monostable means 42 and gate 48 operate to set an upper limit for the recurrence rate of signals on line 38 transmitted to line 52.

Thus, for example, when a signal is first delivered to the pulse treating means 40 with the monostable means 30 and 42 in their stable states, this signal is also delivered over the line 36 to the input of the gate 34 which is not conditioned for passage of signals therethrough. The next occurring pulse or pulses delivered within the 1 millisecond duration of the gating signal from the monostable means 30 to the gate 34 will pass through the gate 34 to the input 50 of the gate 48. If such next occurring pulse, however, occurs after the 1 millisecond period, the monostable means 30 will have returned to its stable state and the gate 34 will again be inhibited from delivering signals therethrough.

If the signal delivered through the gate 34 to the input 50 of the gate 48 occurs more than .25 millisecond after the preceding pulse, it will pass through the gate 48 to the output line 52. However, if the signal occurs less than .25 millisecond after the occurrence of the preceding pulse, the gate 48 will be inhibited by the signal from the monostable means 42 and this signal will not pass through the gate 48 to the output line 52.

The pulse treating means 40 thus sets upper and lower limits to the recurrence rates of signals occurring on the input line 28 which will be delivered to the output line 52. Thereby, the pulse treating means 40 selects and passes therethrough signals having repetition rates within a predetermined range and inhibit the delivery of signals with higher or lower recurrence rates.

Refer to FIGURE 4 which illustrates in block form a pulse treating means 54 which is a modified form of the means 29 shown in FIGURE 2.

While the pulse treating means 29 and 40 of FIGURE 2 and 3 illustrate the treatment or emphasis of signals occurring above or within predetermined limits of recurrence rates, thereby providing enhancement only of predetermined signals for recording, the pulse treating means 54 serves to provide different weights for signals with respective recurrence rates within the range of signals being recorded by the signal processing means 10.

The pulse treating means 54 comprises a plurality of pulse treating means 29, each connected to the input line 28 and having output lines 38. The monostable means 30 of each respective means 29 is provided with a predetermined duration of its output signal to the gate 34. Thus, for example, the monostable means 56 may be provided with an output signal having a duration of 1 millisecond, while the monostable means 58 has an output signal delivered to its gate 34 with a duration of .5 millisecond, while the last shown monostable means 60 may have an output signal delivered to line 32 having a duration of .25 millisecond. Of course, many more means 29 than the three means 29 illustrated may be utilized in the pulse treating means 54 to obtain the desired results. Also, more than one means 29 may be provided having identical durations of their output signals to provide a desired weighting function.

The output line 38 of each of the means 29 is delivered to the input of a signal adder 62 which delivers an output signal with a current amplitude which is the sum of the amplitudes of the input signals received from lines 38 to its output line 64.

In operation, the means 29 having the monostable means 56 will deliver signals having a recurrence period which is too long to be delivered by the means 29 associated with the monostable means 58, while the pulses passed by the gate 38 associated with the monostable means 60 must occur within a shorter interval of time. Thus, pulses which are passed by the gating means 34 gated by means 60 will similarly be passed by the gates 34 associated with the monostable means 56 and 58. These pulses of high recurrence rate are thus concurrently delivered over each of the output lines 38 to the signal adder 62 and are enhanced by the factor of three. Those pulses having longer repetition rates which are not passed by the gate 34 associated with the monostable means 60, but are passed by the gate 34 associated with the monostable means 58, are also passed by the gate 34 associated with the monostable means 56. The output signals delivered to the two respective output lines 38 are delivered to the signal adder 62 to provide an output signal on the line 64 having a relative weight of two. Lastly, for the illustration of the means 54 of FIGURE 4, those pulses which occur within a longer interval of time and have a recurrence rate which is too low to allow them to be passed through the gates 34 associated with the monostable means 58 and 60, but high enough to be passed through the gate 34 associated with the monostable means 56, are delivered by one output line 38 to the signal adder 62 which provides an output signal on line 64 with a relative weight of one.

From the illustrated embodiment of the means 54, it is noted that signals with increasing recurrence rates are provided with increased enhancement or weighting factors. Of course, with the provision of a large number of means 29, almost continuously varying weighting factors may be provided, as well as weighting factors which may be linear, non-linear and in accordance with any desired functional relationship to the rate of recurrence of input signals.

In the signal processing means 10, it is desired to enhance the pulses occurring with increasing recurrence rates since it is desired to record such pulses at a higher intensity than those pulses occurring at the lower recurrence rates. This results in the desired enhancement of those regions in which the scintillation detector 14 detects a higher concentration of radiation sources.

The pulse treating means 29, 40 and 54, as illustrated in FIGURES 2, 3 and 4 thus provide output pulse signals ocurring above or within predetermined recurrence rates, thereby giving instantaneous output signals which are not delayed. These signals are delivered to an output means 20 which includes the light generating means 22. The delivery of pulse signals results in illuminating the means 22 with an average intensity depending upon the current amplitude of the pulses and the rate at which the pulses are delivered to the means 22.

The recording means 24, which may be a photographic apparatus including a light sensitive film, records the intensity of light on its photographic film depending upon the position of the means 22 with respect to the recording means 24. Since the means 22 is caused to move by the scanning means 26 in coordination with the scanning means 16 of the scintillation detector 14, a record is made at a position on the photographic film of the recording means 24 corresponding to the location scanned and the number of radioactive particles or intensity of radiation received from the particular locations scanned by the detector 14. Thus, where radiation is of higher intensity, the rate of pulses delivered by the scintillation detector 14 is increased correspondingly and the output pulses to the light means 22 are correspondingly received at the increased rate, resulting in their enhancement and illumination or light production by the means 22.

The use of the pulse treating means 29 of FIGURE 2 eliminates pulses occurring at a low recurrence rate which would correspond to background radiation, thereby improving the recording of information.

The pulse treating means 40 of FIGURE 3, in addition to eliminating pulses produced by background radiation, also provides an upper limit for the recurrence rate of pulse trains which are transmitted to the light means 22, thereby restricting to an upper limit the intensity of light generated by the means 22. This upper limit of intensity increases the clarity of the record made by preventing the film from being overexposed in particular regions and limiting the range of the pulses to those occurring at a recurrence rate providing the desired information.

The pulse treating means 54, as shown in detail in FIGURE 4, provides enhancement of signals depending upon their recurrence rate, so that in addition to the light means 22 receiving pulse signals at an increased rate when areas of high radiation intensity are being scanned, signals occurring at increased repetition rates are also enhanced to emphasize localized regions of high radiation intensity to make such regions readily evident. It is noted that the enhancement which may be desired or required may also depend upon the particular recording means utilized, and since, for example, various photographic films have light recording sensitivities which are not linearly related to the light intensity generated by the means 22.

The importance of eliminating the time lag in recording radiation intensity is noted in that the presence of such a time lag, in the example given, obscures the precise location of a malignant area. Thus, when a body 12 is being scanned for determining the concentration of radioactive substances in malignant tissues, the time lag of signals to the recording means results in the displacement of the particular locations which are to be determined by the tests, the accurate locations of which are highly desirable. Also, where the scanning means scans in a back and forward direction over a rectangular area, the lag in recording intensities will be displaced in the direction of scanning. Thus, in adjacent scanning paths which are scanned in opposite directions, the lag will occur in different directions, providing a distorted recording of the radioactive sources detected in the scanned area.

As previously noted, the light means 22 may be of a non-filamentary type, such as the glow modulator cold cathode tube which provides a light intensity which is linearly related to the current flow therethrough. Such a tube which is commercially available under the designation Sylvania Type R1131C, in addition to providing a linear relationship between current and radiated light intensity, does not produce a lag in the intensity of light produced due to the heating of the filaments as in the filament type bulbs, thereby further minimizing or eliminating delay in the recording of signals received from the scintillation detector means 14.

It will, of course, be understood that the description and drawings, herein contained, are illustrative merely, and that various modifications and changes may be made in the structure disclosed without departing from the spirit of the invention.

What is claimed is:

1. A signal processing means comprising input means for receiving randomly occurring pulse signals, a signal output line, a signal gating means for conditionally transmitting pulse signals received by said input means to said output line, and a signal generating means having an input lead receiving signals from said input means and being responsive to said signals by delivering output gating signals each of predetermined fixed duration for conditioning said gating means to transmit pulse signals to said output line which are received by said input means only during each of said gating signals, whereby only those pulse signals received by said input means during said gating signals are delivered to said output line.

2. The means of claim 1 in which the said signal generating means is responsive to an input signal to initiate the generation of a said gating signal having a predetermined fixed duration only after the termination of the preceding generated gating signal and during which time said signal gating means is inhibited from transmitting pulse signals, whereby said input signal which initiates the generation of a gating signal by said generating means is not transmitted by said gating means to said output line, but only such pulse signals which follow and occur during the fixed time duration of said gating signal are transmitted by said gating means to said output line.

3. The means of claim 2 including a scintillation detector means for scanning a predetermined region and delivering pulse signals to said input means.

4. The means of claim 3 including recording means receiving the output signals of said output line and recording same to correspond to the scanning of said region by said detector means.

5. The means of claim 4 in which said recording means includes a light generating unit providing a light intensity related to the rate of occurrence of pulse signals from said output line, a photographic recording device sensing and recording the intensity of the light generated by said unit, and means moving said generating unit and said recording device relative to each other to correspond to the scanning position of said detector means to its predetermined scanning region.

6. The means of claim 5 in which said signal generating means comprises a monostable means having a first stable state and a second unstable state, said generating means when in its first state assuming its second state for a predetermined period upon receiving a signal at its input lead and delivering an output signal for the predetermined period during which it is in its second state for conditioning said gating means to transmit signals during said period.

7. A signal processing means comprising input means for receiving randomly occurring pulse signals, a signal output line, a first signal gating means for conditionally transmitting signals from said input means, a second signal gating means conditionally transmitting signals transmitted by said first gating means to said signal output line, a first signal generating means having an input lead receiving signals from said input means and being responsive to said signals by delivering signals of predetermined duration for conditioning said first gating means, to transmit signals to said second gating means, and second signal generating means having an input lead receiving signals from said input means and being responsive to said signals by delivering signals of predetermined duration for conditioning said second gating means to inhibit transmission of signals to said output line.

8. The means of claim 7 including a scintillation detector means for scanning a predetermined region and delivering pulse signals to said input means.

9. The means of claim 8 including recording means receiving the output signals of said output line and recording same to correspond to the scanning of said region by said detector means.

10. The means of claim 9 in which said recording means includes a light generating unit providing a light intensity related to the rate of occurrence of pulse signals from said output line, a photographic recording device sensing and recording the intensity of the light generated by said unit, and means moving said generating unit and said recording device relative to each other to correspond to the scanning position of said detector means to its predetermined scanning region.

11. The means of claim 10 in which said first and second signal generating means each comprise a monostable oscillator having a first stable state and a second unstable state, said first generating means when in its first state assuming its second state for a predetermined period upon receiving a signal at its input lead and delivering an output signal for the predetermined period during which it is in its second state for conditioning said first gating means to transmit signals during said period, and said second generating means when in its first state assuming its second state for a predetermined period upon receiving a signal at its input lead and delivering an output signal for the predetermined period during which it is in its second state for conditioning said second gating means to inhibit transmission of signals during said period, the period of the output signal of said first generating means being greater than the period of the signal of the output signal of said second generating means, signals at said input means being delivered to said output line only in the presence of an output signal of said first generating means and the absence of an output signal of said second generating means.

12. A signal processing means comprising input means for receiving randomly occurring pulse signals, a plurality of signal output lines, a plurality of signal gating means connected parallel to one another each for conditionally transmitting signals from said input means to a respective one of said output lines, and a plurality of signal generating means each having an input lead receiving signals from said input means and being responsive to said signals by delivering output signals of respectively predetermined fixed duration for conditioning a respective one of said gating means to transmit signals to its respective said output line.

13. The means of claim 12 including a signal adding means receiving the signals delivered to said output lines and delivering an output signal which is the sum of said input signals.

14. A signal processing means comprising input means for receiving randomly occurring pulse signals, a plurality of signal output lines, a plurality of signal gating means each for conditionally transmitting signals from said input means to a respective one of said output lines, a plurality of signal generating means each having an input lead receiving signals from said input means and being responsive to said signals by delivering output signals of respectively predetermined duration for conditioning a respective one of said gating means to transmit signals to its respective said output line, one of said signal generating means providing an output signal with a predetermined duration greater than the predetermined duration of the output signal of another of said signal generating means to provide a signal weighting function for said signal processing means, and a signal adding means receiving the signals delivered to said output lines and delivereing an output signal which is the sum of said input signals.

15. The means of claim 14 including a scintillation detector means for scanning a predetermined region and delivering pulse signals to said input means.

16. The means of claim 15 including recording means receiving the output signals of said signal adding means and recording same to correspond to the scanning of said region by said detector means.

17. The means of claim 16 in which said recording means includes a light generating unit providing a light intensity directly corresponding to the amplitude and rate of occurrence of pulse signals received by said signal adding means from said output lines, a photographic recording device sensing and recording the intensity of the light generated by said unit, and scanning means moving said generating unit and said recording device relative to each other to correspond to the scanning position of said detector means with respect to its predetermined scanning region.

18. The means of claim 17 in which said plurality of signal generating means respectively comprise a plurality of monostable means each having a first stable state and a second unstable state, each said monostable means when in its first state assuming its second state for a predetermined period upon receiving a signal at its input lead and delivering an output signal for the predetermined period during which it is in its second state for conditioning its respective said gating means to transmit signals during its said period.

19. The means of claim 18 in which the respective durations of the output signals of said generating means provide an increasing weighting function for signals occurring with increasing repetition rates.

References Cited by the Examiner
UNITED STATES PATENTS

| | | | |
|---|---|---|---|
| 2,837,639 | 6/1958 | Gray et al. | 250—83.6 X |
| 3,159,744 | 12/1964 | Stickney et al. | 250—71.5 |
| 3,193,681 | 7/1965 | Schwarz | 250—83.3 |

RALPH G. NILSON, *Primary Examiner.*

ARCHIE R. BORCHELT, *Examiner.*